United States Patent
Toda et al.

(10) Patent No.: US 10,012,672 B2
(45) Date of Patent: Jul. 3, 2018

(54) MOVING STATE DETECTING DEVICE

(75) Inventors: Hiroyuki Toda, The Presidio of San Francisco, CA (US); Ken Yoshitake, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 1379 days.

(21) Appl. No.: 13/265,762

(22) PCT Filed: Apr. 19, 2010

(86) PCT No.: PCT/JP2010/056932
§ 371 (c)(1),
(2), (4) Date: Oct. 21, 2011

(87) PCT Pub. No.: WO2010/134411
PCT Pub. Date: Nov. 25, 2010

(65) Prior Publication Data
US 2012/0041702 A1   Feb. 16, 2012

(30) Foreign Application Priority Data
May 19, 2009   (JP) .................. 2009-121375

(51) Int. Cl.
*G01P 21/00* (2006.01)
*G01C 21/16* (2006.01)

(52) U.S. Cl.
CPC .............. *G01P 21/00* (2013.01); *G01C 21/16* (2013.01)

(58) Field of Classification Search
CPC ......... G01C 21/10; G01C 21/12; G01C 21/16
See application file for complete search history.

(56) References Cited

U.S. PATENT DOCUMENTS 4,213,116 A * 7/1980 Holtzman ................ B60Q 1/40
                                                        200/52 A
6,254,204 B1   7/2001 Hara et al.
(Continued)

FOREIGN PATENT DOCUMENTS

CN         1885062 A    12/2006
CN       101189794 A     5/2008
(Continued)

OTHER PUBLICATIONS

Ramalingam et al. "Microelectromechnical Systems Inertial Measurement Unit Error Modelling and Error Analysis for Low-cost Strapdown Inertial Navigation System" Defence Science Journal, vol. 59, No. 6, Nov. 2009, pp. 650-658.*

(Continued)

*Primary Examiner* — John Kuan
(74) *Attorney, Agent, or Firm* — Studebaker & Brackett PC (57) ABSTRACT

To accurately calculate an attached angle of an accelerometer and accurately correct an acceleration that is obtained from the accelerometer: a frequency analyzing module of an acceleration corrector divides a sensor coordinate system acceleration into a bias frequency component, a gravity frequency component, a movement acceleration frequency component, and a noise frequency component, through a wavelet transform. The frequency analyzing module outputs a sum component of the gravity frequency component and the movement acceleration frequency component to an attached angle estimating module and a correcting operation module. The attached angle estimating module estimation-calculates the attached angle of an accelerometer and outputs it to the correcting operation module. The correcting operation module corrects the acceleration, which is including of the sum component of the gravity frequency component and the movement acceleration frequency component, (Continued)

based on the estimation-calculated attached angle to calculate a movable body coordinate system acceleration.

12 Claims, 5 Drawing Sheets

(56) References Cited

U.S. PATENT DOCUMENTS

| | | | |
|---|---|---|---|
| 6,681,199 | B2 | 1/2004 | Imai et al. |
| 2004/0172173 | A1* | 9/2004 | Goto et al. ............... 701/1 |
| 2007/0146323 | A1* | 6/2007 | Nishikata et al. ......... 345/158 |
| 2008/0079594 | A1 | 4/2008 | Tronconi et al. |
| 2008/0114545 | A1* | 5/2008 | Takaoka et al. ........... 701/220 |
| 2008/0234933 | A1* | 9/2008 | Chowdhary et al. ...... 701/213 |
| 2009/0018772 | A1* | 1/2009 | Watanabe et al. ........ 701/214 |

FOREIGN PATENT DOCUMENTS

| | | |
|---|---|---|
| DE | 19844911 A1 | 4/2000 |
| EP | 1832882 A1 | 9/2007 |
| JP | 09-043269 A | 2/1997 |
| JP | 10-104259 A | 4/1998 |
| JP | 10-332415 A | 12/1998 |
| JP | 11-190743 A | 7/1999 |
| JP | 2001-109738 A | 4/2001 |
| JP | 2004-138553 A | 5/2004 |
| JP | 2006-010520 A | 1/2006 |
| JP | 2007107951 A * | 4/2007 |
| JP | 2007-137306 A | 6/2007 |
| JP | 2008-058273 A | 3/2008 |
| WO | 2006-103246 A1 | 10/2006 |
| WO | 2008-091722 A1 | 7/2008 |

OTHER PUBLICATIONS

Ei-Sheimy et al., "Wavelet De-Noising for IMU Alignment", IEEE A&E Systems Magazine, Oct. 2004.*
Translation for JP 10332415.*
Translation for JP 2007107951.*
Extended European Search Report of the corresponding European Patent Application No. 10777646.0, dated Oct. 19, 2012.
1st Office Action of the corresponding Chinese Patent Application No. 201080020698.3, dated Nov. 28, 2012.
2nd Office Action of the corresponding Chinese Patent Application No. 201080020698.3, dated Aug. 1, 2013.

* cited by examiner

MOVING STATE DETECTING DEVICE

TECHNICAL FIELD

The present invention relates to a moving state detecting device that is attached in a moving body and detects a moving state such as a speed and a pitch angle of the moving body.

BACKGROUND ART

Currently, various kinds of navigation apparatuses that are attached to movable bodies, such as automobiles, and detect a position, a traveling speed, and a traveling direction of the movable body and displaying information for assisting in traveling toward a destination have been devised. With such navigation apparatuses, a position of the device itself is detected based on positioning signals from positioning satellites, such as GPS satellites, and a moving state of a movable body is detected by using speed information that the movable body already has, such as a vehicle speed pulse in an automobile, and azimuth information that is obtained by, for example, a gyroscope.

Meanwhile, recently, as alternatives to the navigation apparatuses described above that are installed in the movable bodies in advance and can acquire, for example, the speed information of the movable body, various personal navigation devices that can perform a navigation as a stand-alone navigation devices by, for example, acquiring speed information, and are comparatively compact sized and portable have been devised. Therefore, by attaching such a personal navigation apparatus to a movable body, even if a navigation apparatus is not installed in the movable body in the first place, a navigation system can be used.

When using such personal navigation apparatuses, depending on an attached angle on the movable body, that is an attached angle of an accelerometer within the personal navigation apparatus on the movable body, there is a case where a traveling speed and a traveling azimuth of the movable body cannot correctly be obtained and a navigation cannot correctly be performed. Therefore, an attached angle calculating device such as the one disclosed in either one of Patent Documents 1 and 2 is installed in the navigation apparatus, the attached angle of the accelerometer is calculated, and an acceleration is corrected.

REFERENCE DOCUMENT(S) OF CONVENTIONAL ART

Patent Documents

Patent Document 1: JP2007-107951A
Patent Document 2: JP2009-014732A

DISCLOSURE OF THE INVENTION

Problem(s) to be Solved by the Invention

However, the attached angle calculating devices disclosed in the Patent Documents 1 and 2 described above are not for detecting the attached angle only from an output value of the accelerometer but for detecting by using, for example, an angular velocity obtained from a gyroscope or an angular rate sensor, and a vehicle speed pulse obtained from the movable body. Further, although the acceleration that is outputted from the accelerometer contains unnecessary components such as a bias component and a noise component, these components are not taken into consideration here. Therefore, because the attached angle of the accelerometer is calculated using the acceleration containing an error due to the bias component and the noise component, the attached angle cannot accurately be calculated. Thus, the acceleration obtained from the accelerometer cannot accurately be corrected and the traveling speed and the traveling azimuth of the movable body cannot correctly be obtained.

An object of the present invention is to realize a moving state detecting device for removing influence of unnecessary components, such as a bias component and a noise component, contained in an acceleration that is outputted from an accelerometer, calculating an attached angle of the accelerometer, and thereby, accurately correcting the acceleration obtained from the accelerometer.

Means for Solving the Problems

A moving state detecting device of this invention includes an accelerometer and an acceleration correcting module. The accelerometer is installed in a movable body and calculates an acceleration of the movable body. The acceleration correcting module divides, for every frequency band, the acceleration that is obtained from the accelerometer, estimating an attached angle of the accelerometer based on a gravity frequency component and a movement acceleration frequency component that are formed by predetermined frequency band components, respectively, and correcting the acceleration based on the attached angle.

Further specifically, the moving state detecting device of this invention may include the accelerometer and the acceleration correcting module. The accelerometer may be installed in the movable body and calculate the acceleration of the movable body. The acceleration correcting module may divide, for every frequency band sequentially from a low frequency side, the acceleration obtained from the accelerometer into a bias frequency component, the gravity frequency component, the movement acceleration frequency component, and a noise frequency component, estimate the attached angle of the accelerometer based on the gravity frequency component and the movement acceleration frequency component, and correct the acceleration based on the attached angle.

In this configuration, the acceleration that is obtained from the accelerometer is divided for every frequency band. Here, the bias frequency component is a component that is substantially constantly outputted regardless of a moving state of the movable body and is formed by an extremely low range frequency. The noise frequency component is a component that continuously changes at random regardless of the moving state of the movable body and is formed by a high range frequency. Further, aside from these, the gravity frequency component and the movement acceleration frequency component depend on the moving state of the movable body, and since variations thereof are greater than the bias frequency component, these components have frequencies higher than the bias frequency component, and since these components do not have randomness more than the noise frequency component, they have frequencies lower than the noise frequency component. Therefore, by dividing the acceleration for every frequency component, unnecessary components including the bias frequency component and the noise frequency component that do not depend on the moving state of the movable body can be removed. Thereby, a correct acceleration that is comprised only of the gravity frequency component and the movement acceleration frequency component that depend on the moving state of the movable body can be obtained.

The acceleration correcting module of the moving state detecting device of this invention may frequency-divide the acceleration through a wavelet transform.

In this configuration, by using the wavelet transform to obtain each of the frequency components of the acceleration, not only each of the frequency components developed on a frequency axis can be obtained, but also, for example, a transition state of each of the frequency components on a time axis can easily be obtained.

Further, the accelerometer of the moving state detecting device of this invention may detect acceleration components with a front-and-rear direction acceleration component, a left-and-right direction acceleration component, and an up-and-down direction acceleration component, all of which are perpendicular to each other respectively. The acceleration correcting module may perform at least one of an estimation of an attached angle in an azimuth direction based on the front-and-rear direction acceleration component and the left-and-right direction acceleration component, an estimation of an attached angle in a pitch direction based on the front-and-rear direction acceleration component and the up-and-down direction acceleration component, and an estimation of an attached angle in a roll direction based on the front-and-rear direction acceleration component, the left-and-right direction acceleration component, the up-and-down direction acceleration component, and the pitch direction attached angle.

Further, the accelerometer of the moving state detecting device of this invention may detect acceleration components with a front-and-rear direction acceleration component, a left-and-right direction acceleration component, and an up-and-down direction acceleration component, all of which are perpendicular to each other respectively. The acceleration correcting module may estimate an attached angle in an azimuth direction based on the front-and-rear direction acceleration component and the left-and-right direction acceleration component, estimate an attached angle in a pitch direction based on the front-and-rear direction acceleration component and the up-and-down direction acceleration component, and estimate an attached angle in a roll direction based on the front-and-rear direction acceleration component, the left-and-right direction acceleration component, the up-and-down direction acceleration component, and the pitch direction attached angle.

These configurations show a case where specifically orthogonal triaxial acceleration components are obtained and the sterically attached angle of the accelerometer are estimation-calculated.

Further, the acceleration correcting module of the moving state detecting device of this invention may estimate at least one of the azimuth direction attached angle and the pitch direction attached angle when the left-and-right direction acceleration component is below a predetermined threshold.

Further, when the left-and-right direction acceleration component is below a predetermined threshold, the acceleration correcting module of the moving state detecting device of this invention may estimate at least one of the azimuth direction attached angle and the pitch direction attached angle.

Further, when the left-and-right direction acceleration component is above the predetermined threshold, the acceleration correcting module of the moving state detecting device of this invention may estimate the roll direction attached angle.

These configurations show specific methods of calculating the attached angle. The azimuth direction attached angle, the pitch direction attached angle, and the roll direction attached angle are estimated according to the transitions of the moving state of the movable body based on the left-and-right direction acceleration component.

Further, the acceleration correcting module of the moving state detecting device of this invention may sequentially store the estimated attached angle as well as calculate the attached angle through time averaging processing. Here, if the latest estimated attached angle is different from the previously estimated attached angle by a predetermined angle or above, the acceleration correcting module may reduce a weight of the previous attached angle in the time averaging processing.

In this configuration, by performing the time averaging processing, an error component of the estimated attached angle is suppressed. For example, when the vehicle travels through a normal urban area or the like, the traveling route is mostly a flat ground, the error component due to the attached angle influenced by an inclined angle estimated at the time of traveling an uphill or a downhill is suppressed by the time averaging processing. Thereby, the attached angle can highly accurately be calculated. If the attached angle is changed greatly upon this because, for example, the attached angle is forcibly changed by a user, the influence by the attached angle which is estimate-calculated previously can be suppressed.

Further, the moving state detecting device of this invention may include a speed/traveling-angle calculating module for calculating at least one of a speed of the movable body and a traveling pitch angle serving as an up-and-down direction inclination angle, based on the acceleration corrected by the acceleration correcting module.

This configuration shows a specific configuration of the moving state detecting device as a example. The speed and the traveling angle of the movable body can be calculated accurately from the acceleration of the movable body which is obtained accurately as described above.

Further, when the traveling pitch angle is calculated, the speed/traveling-angle calculating module of the moving state detecting device of this invention may calculate a divided value of the gravity frequency component by a gravity acceleration and correct the calculated traveling pitch angle based on the divided value.

In this configuration, in a case of using the above described time averaging processing, a summation error due to the time averaging processing may be caused. Therefore, by correcting the traveling pitch angle obtained by the time averaging processing using the traveling pitch angle that is obtained only from the gravity frequency component of the acceleration, which is obtained from the accelerometer, and the gravity acceleration, the summation error is suppressed and, thereby, a highly accurate traveling pitch angle can continuously be calculated.

Further, the moving state detecting device of this invention may include a stop detecting module for detecting, when the noise frequency component is calculated, a stopping of the movable body by detecting a sum of the movement acceleration frequency component and the noise frequency component is below a predetermined threshold.

In this configuration, the stop state can correctly be detected as a mode of the above described moving state of the movable body.

Further, a navigation apparatus of this invention includes the moving state detecting device described above. The navigation apparatus executes a position measurement of the apparatus itself and navigation processing based on information relating to a movement of the movable body calculated by the moving state detecting device.

In this configuration, as described above, the highly accurate acceleration, speed, and traveling pitch angle can be obtained by the moving state detecting device and thus, the correct navigation processing can be achieved by using them.

Effect of the Invention

According to this invention, an acceleration can highly accurately be obtained by dividing the acceleration for every frequency band, therefore, an attached angle of an accelerometer can accurately be calculated and the acceleration can highly accurately be corrected. Thereby, a speed and a traveling angle of a movable body can highly accurately be detected.

MODES OF CARRYING OUT THE INVENTION

A moving state detecting device according to a first embodiment of the present invention is described in detail with reference to the drawings. The moving state detecting device according to this embodiment is used for various kinds of navigation apparatuses, such as a vehicle-mounted navigation apparatus and a PND (Personal Navigation Device).

Figure 1:
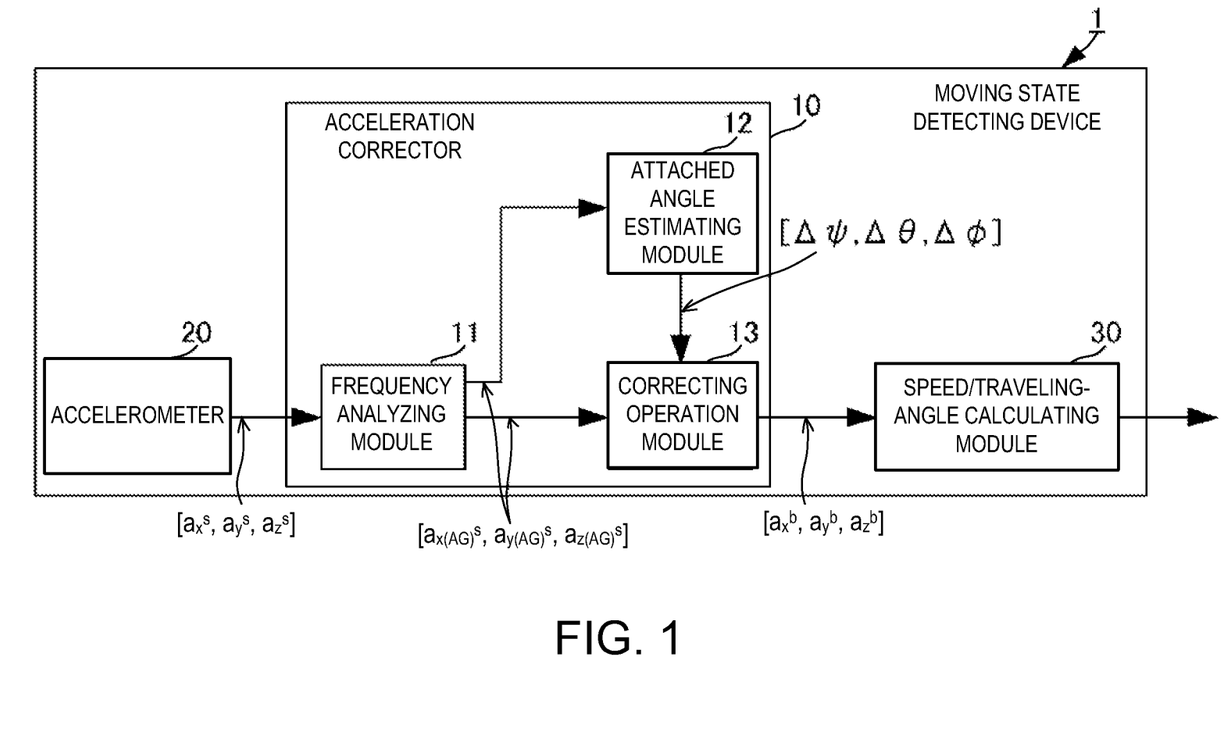
FIG. 1 is a block diagram showing a main configuration of a moving state detecting device 1 of a first embodiment.

FIG. 1 is a block diagram showing a main configuration of a moving state detecting device 1 of this embodiment.

As shown in FIG. 1, the moving state detecting device 1 includes an accelerometer 20, an acceleration corrector 10, and a speed/traveling-angle calculating module 30. The moving state detecting device 1 is fixedly installed in a movable body such as a vehicle. Note that, the moving stated detecting device 1 of this embodiment is for detecting a speed and a traveling angle (a traveling pitch angle, a traveling roll angle, and a traveling azimuth angle (yaw angle)) of the movable body; however, if it is for, for example, only outputting an acceleration of the movable body, the speed/traveling-angle calculating module 30 may be omitted.

The accelerometer 20 detects, in a coordinate system of itself (sensor coordinate system), a sensor coordinate system acceleration $[a_x^s, a_y^s, a_z^s]$ comprised of the acceleration component $a_x^s$ corresponding to x-axial directions as front-and-rear directions of the movable body, the acceleration component $a_y^s$ corresponding to y-axial directions as left-and-right directions of the movable body, and the acceleration component $a_z^s$ corresponding to z-axial directions as up-and-down directions of the movable body.

Figure 2:
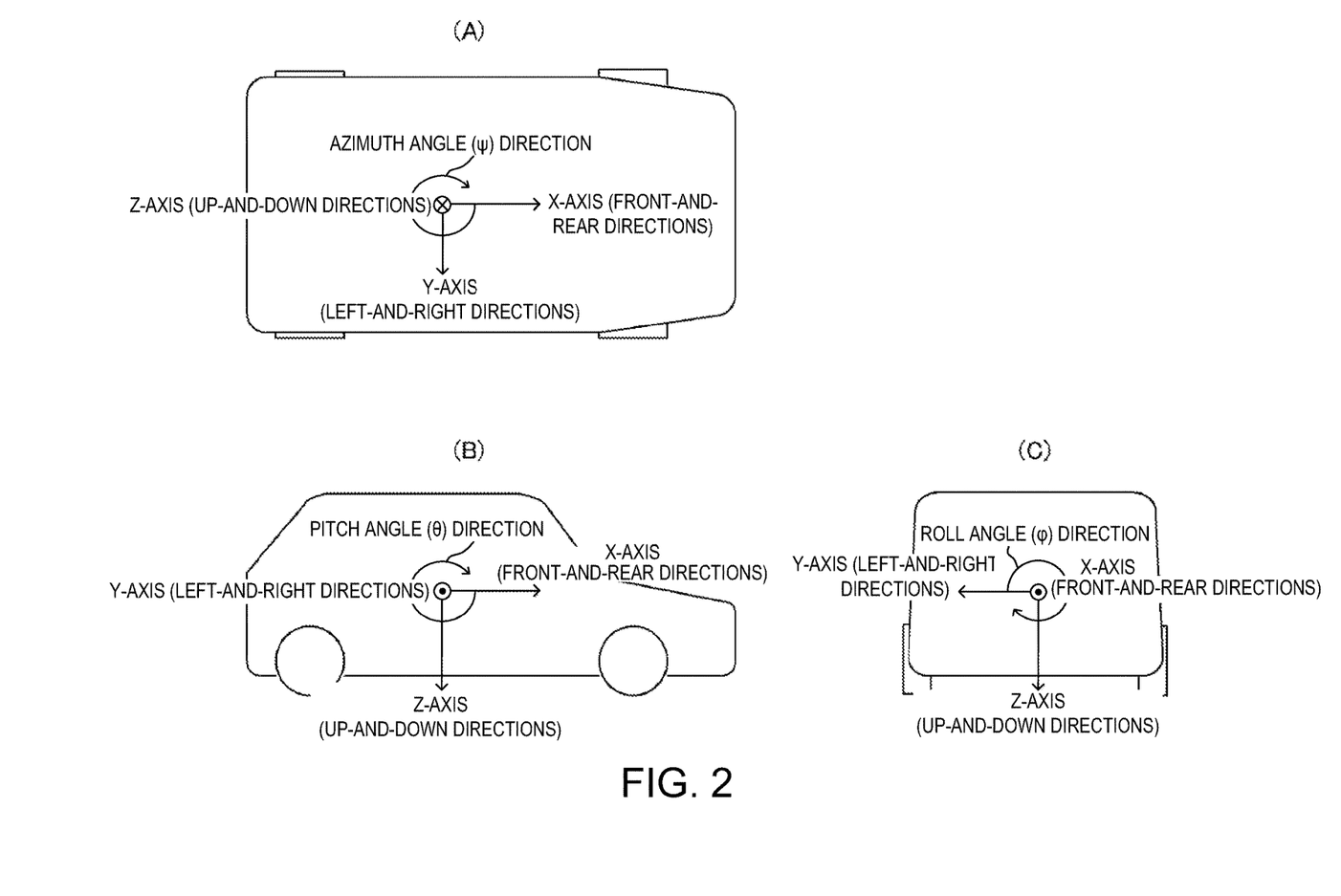
FIG. 2 is views explaining an attached angle of an accelerometer 20 to a movable body.

Here, to the movable body, the accelerometer 20 is attached at an attached angle $[\Delta\psi, \Delta\theta, \Delta\varphi]$ comprised of the azimuth direction attached angle $\Delta\psi$, the pitch direction attached angle $\Delta\theta$, and the roll direction attached angle $\Delta\varphi$. Further, the attached angle $[\Delta\psi, \Delta\theta, \Delta\varphi]$ is based on a coordinate system shown in FIG. 2. FIG. 2 is views explaining a coordinate system of the movable body.

As shown in FIG. 2, the coordinate system of the movable body is an orthogonal triaxial coordinate system comprised of the x-axis having the front-and-rear directions of the movable body as its axial directions, the y-axis having the left-and-right directions of the movable body as its axial directions, and the z-axis having the up-and-down directions of the movable body as its axial directions. Moreover, a direction toward which the movable body rotates about the x-axis as a central axis is a roll angle ($\varphi$) direction, a direction toward which the movable body rotates about the y-axis as a central axis is a pitch angle ($\theta$) direction, and a direction toward which the movable body rotates about the z-axis as a central axis is an azimuth angle ($\psi$) direction.

As above, the accelerometer 20 is attached to the movable body at the attached angle $[\Delta\psi, \Delta\theta, \Delta\varphi]$, therefore, between the components of the sensor coordinate system acceleration $[a_x^s, a_y^s, a_z^s]$ and components of a movable body coordinate system acceleration $[a_x^b, a_y^b, a_z^b]$, differences according to solid angles which are based on the attached angle $[\Delta\psi, \Delta\theta, \Delta\varphi]$ are caused, respectively.

The acceleration corrector 10 includes a frequency analyzing module 11, an attached angle estimating module 12, and a correcting operation module 13.

The frequency analyzing module 11 converts the sensor coordinate system acceleration $[a_x^s, a_y^s, a_z^s]$ into acceleration component groups on a frequency axis through a wavelet transform. Further specifically, the frequency analyzing module 11 acquires the sensor coordinate system acceleration $[a_x^s, a_y^s, a_z^s]$, for example, every second, stores data thereof for sixty four seconds, and performs the wavelet transform based on these sixty four seconds of data. Further, the frequency analyzing module 11 acquires a substantially constant component (DC component) corresponding to a sixty-four seconds of sampling period, a variable component (AC component) corresponding to a thirty-two seconds of sampling period, a variable component (AC component) corresponding to a sixteen seconds of sampling period, a variable component (AC component) corresponding to an eight seconds of sampling period, a variable component (AC component) corresponding to a four seconds of sampling period, a variable component (AC component) corresponding to a two seconds of sampling period, and a variable component (AC component) corresponding to a one second of sampling period.

The frequency analyzing module 11 sets the acquired sixty-four-second width DC component with an extremely low range frequency as a bias frequency component, the thirty-two-second width and sixteen-second width AC components with middle range frequencies as gravity frequency components, the eight-second width, four-second width, and two-second width AC components with middle range frequencies as movement acceleration frequency components, and the one-second width AC component as a noise frequency component. These components are set based on the following fundamentals.

First, the DC component obtained in the sixty-four-second width is set as above because it can be assumed that the accelerometer 20 substantially constantly outputs it, regardless of a moving state of the movable body. Next, the AC components obtained in the thirty-second width and the sixteen-second width are set as above because they can be assumed to be the components that rely on the moving state of the movable body although an influence therefrom is comparatively low, and tend to depend more on the gravity on the movable body compared to a movement acceleration of the movable body. Next, the AC components obtained in the eight-second width, the four-second width, and two-second width are set as above because they can be assumed to be the components that are easily influenced by the moving state of the movable body and tend to depend more on the movement acceleration of the movable body compared to the constantly caused gravity acceleration. Next, the AC component obtained in the one-second width is set as above because it can be assumed to have randomness more than the movement acceleration of the movable body.

The frequency analyzing module 11 outputs, as a detection acceleration $[a_{x(AG)}^s, a_{y(AG)}^s, a_{z(AG)}^s]$ a sum of the gravity frequency component and the movement acceleration frequency component that are obtained through the wavelet transform, to the attached angle estimating module 12 and the correcting operation module 13.

The attached angle estimating module 12 performs an estimation calculation of the attached angle $[\Delta\psi, \Delta\theta, \Delta\varphi]$ from the detection acceleration $[a_{x(AG)}^s, a_{y(AG)}^s, a_{z(AG)}^s]$. The estimation of this attached angle may be performed, for example, every second according to the above acquisition timing of the sensor coordinate system acceleration and, alternatively, may be performed at each timing, which is suitably set, while buffering each frequency component of the sensor coordinate system acceleration.

Here, the estimation calculation fundamentals for the attached angle $[\Delta\psi, \Delta\theta, \Delta\varphi]$ are explained. When the sensor coordinate system acceleration is $[a_x^s, a_y^s, a_z^s]$, the moving body coordinate system acceleration is $[a_x^b, a_y^b, a_z^b]$, and the attached angle is $[\Delta\psi, \Delta\theta, \Delta\varphi]$, the following equation is established.

$$\begin{bmatrix} a_x^s \\ a_y^s \\ a_z^s \end{bmatrix} = C_b^s \begin{bmatrix} a_x^b \\ a_y^b \\ a_z^b \end{bmatrix} \qquad (1)$$

"$C_b^s$" is a rotation matrix for converting the movable body coordinate system into the accelerometer coordinate system, and it can be expressed as the following equation using the attached angle $[\Delta\psi, \Delta\theta, \Delta\varphi]$.

$$C_b^s = \begin{pmatrix} 1 & 0 & 0 \\ 0 & \cos(\Delta\varphi) & \sin(\Delta\varphi) \\ 0 & -\sin(\Delta\varphi) & \cos(\Delta\varphi) \end{pmatrix} \qquad (2)$$

$$\begin{pmatrix} \cos(\Delta\theta) & 0 & -\sin(\Delta\theta) \\ 0 & 1 & 0 \\ \sin(\Delta\theta) & 0 & \cos(\Delta\theta) \end{pmatrix} \begin{pmatrix} \cos(\Delta\psi) & \sin(\Delta\psi) & 0 \\ -\sin(\Delta\psi) & \cos(\Delta\psi) & 0 \\ 0 & 0 & 1 \end{pmatrix} =$$

$$\begin{pmatrix} \cos(\Delta\psi)\cos(\Delta\theta) & \sin(\Delta\psi)\cos(\Delta\theta) & -\sin(\Delta\theta) \\ -\sin(\Delta\psi)\cos(\Delta\varphi) + \cos(\Delta\psi)\sin(\Delta\theta)\sin(\Delta\varphi) & \cos(\Delta\psi)\cos(\Delta\varphi) + \sin(\Delta\psi)\sin(\Delta\theta)\sin(\Delta\varphi) & \cos(\Delta\theta)\sin(\Delta\varphi) \\ \sin(\Delta\psi)\sin(\Delta\varphi) + \cos(\Delta\psi)\sin(\Delta\theta)\cos(\Delta\varphi) & -\cos(\Delta\psi)\sin(\Delta\varphi) + \sin(\Delta\psi)\sin(\Delta\theta)\cos(\Delta\varphi) & \cos(\Delta\theta)\cos(\Delta\varphi) \end{pmatrix}$$

Here, when each element of the attached angle $[\Delta\psi, \Delta\theta, \Delta\varphi]$ is $\Delta\psi \ll 1$ [rad], $\Delta\theta \ll 1$ [rad], and $\Delta\varphi \ll 1$ [rad], the rotation matrix $C_b^s$ can be approximated as the following equation.

$$C_b^s = \begin{bmatrix} 1 & \Delta\psi & -\Delta\theta \\ -\Delta\psi & 1 & \Delta\varphi \\ \Delta\theta & -\Delta\varphi & 1 \end{bmatrix} \qquad (3)$$

Therefore, Equation (1) can be expressed as the following equation.

$$\begin{bmatrix} a_x^s \\ a_y^s \\ a_z^s \end{bmatrix} = \begin{bmatrix} 1 & \Delta\psi & -\Delta\theta \\ -\Delta\psi & 1 & \Delta\varphi \\ \Delta\theta & -\Delta\varphi & 1 \end{bmatrix} \qquad (4)$$

Here, by using the detection acceleration in which the bias frequency component and the noise frequency component are removed by the frequency analyzing module 11, Equation (4) becomes as the following equation.

$$\begin{bmatrix} a_{x(AG)}^s \\ a_{y(AG)}^s \\ a_{z(AG)}^s \end{bmatrix} = \begin{bmatrix} 1 & \Delta\psi & -\Delta\theta \\ -\Delta\psi & 1 & \Delta\varphi \\ \Delta\theta & -\Delta\varphi & 1 \end{bmatrix} \begin{bmatrix} a_x^b \\ a_y^b \\ a_z^b \end{bmatrix} \qquad (5)$$

Meanwhile, if the movable body is traveling straight on a flat ground, the left-and-right direction component $a_y^b$ and the up-and-down direction component $a_z^b$ of the movable body coordinate system acceleration $[a_x^b, a_y^b, a_z^b]$ can be assumed to be "0". That is, $a_y^b = 0$ and $a_z^b = 0$.

Therefore, Equation (5) can be expressed as the following equation.

$$\begin{bmatrix} a_{x(AG)}^s \\ a_{y(AG)}^s \\ a_{z(AG)}^s \end{bmatrix} = \begin{bmatrix} 1 & \Delta\psi & -\Delta\theta \\ -\Delta\psi & 1 & \Delta\varphi \\ \Delta\theta & -\Delta\varphi & 1 \end{bmatrix} \begin{bmatrix} a_x^b \\ 0 \\ 0 \end{bmatrix} = \begin{bmatrix} a_x^b \\ -a_x^b \cdot \Delta\psi \\ a_x^b \cdot \Delta\theta \end{bmatrix} \qquad (6)$$

Thereby, when the front-and-rear direction component $a_{x(AG)}^s$ is not "0", the azimuth direction attached angle $\Delta\psi$ and the pitch direction attached angle $\Delta\theta$ are calculated based on the following equations.

$$\Delta\psi = -\frac{a_{y(AG)}^s}{a_{x(AG)}^s} \qquad (7A)$$

$$\Delta\theta = +\frac{a_{z(AG)}^s}{a_{x(AG)}^s} \qquad (7B)$$

Further, if the movable body is turning while traveling on a flat ground, the up-and-down direction component $a_z^b$ of the movable body coordinate system acceleration $[a_x^b, a_y^b, a_z^b]$ can be assumed to be "0" and the front-and-rear direction component $a_x^b$ and the left-and-right direction component $a_y^b$ thereof can be assumed to be substantially the same level. Further, by using the above approximation condition $\Delta\psi \ll 1$ [rad], Equation (5) can be expressed as the following equation.

$$\begin{bmatrix} a^s_{x(AG)} \\ a^s_{y(AG)} \\ a^s_{z(AG)} \end{bmatrix} = \begin{bmatrix} 1 & \Delta\psi & -\Delta\theta \\ -\Delta\psi & 1 & \Delta\phi \\ \Delta\theta & -\Delta\phi & 1 \end{bmatrix} \begin{bmatrix} a^b_x \\ a^b_y \\ 0 \end{bmatrix} = \begin{bmatrix} a^b_x + a^b_y \cdot \Delta\psi \\ a^b_y - a^b_x \cdot \Delta\psi \\ a^b_x \cdot \Delta\theta - a^b_y \cdot \Delta\phi \end{bmatrix} \approx \begin{bmatrix} a^b_x \\ a^b_y \\ a^b_x \cdot \Delta\theta - a^b_y \cdot \Delta\phi \end{bmatrix} \quad (8)$$

Thereby, the roll direction attached angle $\Delta\varphi$ is calculated by the following equation using also the pitch direction attached angle $\Delta\theta$ calculated by Equation (7) described above.

$$\Delta\phi = -\frac{a^s_{z(AG)} - a^s_{x(AG)} \cdot \Delta\theta}{a^s_{y(AG)}} \quad (9)$$

As described above, the attached angle $[\Delta\psi, \Delta\theta, \Delta\varphi]$ can be estimation calculated only from the detection acceleration $[a^s_{x(AG)}, a^s_{y(AG)}, a^s_{z(AG)}]$.

Meanwhile, although having a flat ground is the condition for the calculation processing as described above, by performing time averaging processing described as follows, the condition to have the flat ground can be removed. This is because, in a normal urban area travel, a period of traveling on a flat ground is much longer than a period of traveling on a sloped ground on an uphill or a downhill. According to the setting thereof, the azimuth direction attached angle $\Delta\psi$, the pitch direction attached angle $\Delta\theta$, and the roll direction attached angle $\Delta\varphi$ are calculated by the following equations. Note that, in the following equations, "E [operational expression]" is an operator indicating the time averaging processing.

$$\Delta\psi = E_{\Delta\psi}\left[-\frac{a^s_{y(AG)}}{a^s_{x(AG)}}\right] \quad (10A)$$

$$\Delta\theta = E_{\Delta\theta}\left[\frac{a^s_{z(AG)}}{a^s_{x(AG)}}\right] \quad (10B)$$

$$\Delta\phi = E_{\Delta\phi}\left[-\frac{a^s_{z(AG)} - a^s_{x(AG)} \cdot \Delta\theta}{a^s_{y(AG)}}\right] \quad (10C)$$

Further, in the above calculation processing, the selective conditions between the straight travel and the turning travel are set, in which a threshold for detecting a turning is set in advance for the left-and-right direction acceleration $a^s_{y(AG)}$, and it may be determined as the turning travel when the left-and-right direction acceleration $a^s_{y(AG)}$ is above the threshold, and it may be determined as the straight travel when the left-and-right direction acceleration $a^s_{y(AG)}$ is below the threshold. Alternatively, a threshold for detecting the turning is set in advance for the left-and-right direction acceleration $a^b_y$ in the movable body coordinate system that is calculated by the correcting operation module 13 as described below, and it may be determined as the turning travel when the left-and-right direction acceleration $a^b_y$ is above the threshold, and it may be determined as the straight travel when the left-and-right direction acceleration $a^b_y$ is below the threshold.

Based on the above described fundamentals, the attached angle estimating module 12 calculates the attached angle $[\Delta\psi, \Delta\theta, \Delta\varphi]$ at every predetermined timing based on the above Equations (7A), (7B) and (10), and upon performing processing using a Kalman filter which corresponds to the time averaging processing, outputs the attached angle $[\Delta\psi, \Delta\theta, \Delta\varphi]$, which is estimation-calculated, to the correcting operation module 13.

Here, an example in which Kalman filter processing using a first order LPF is performed on the azimuth direction attached angle $\Delta\psi$ is described; however, also for the others, the pitch direction attached angle $\Delta\theta$ and the roll direction attached angle $\Delta\psi$, the Kalman filter processing is similarly performed.

By having the azimuth direction attached angle $\Delta\psi$ at a timing t denoted by $\Delta\psi[t]$ and the azimuth direction attached angle $\Delta\psi$ at the next timing denoted by $\Delta\psi[t+1]$, the following equation can be set.

$$\Delta\psi[t+1] = \Delta\psi[t] + \alpha \cdot \left(-\frac{a^s_{y(AG)}}{a^s_{x(AG)}} - \Delta\psi[t]\right) \quad (11)$$

Note that, when $a_{x(AG)}{}^s=0$ or while a vehicle is turning, $\Delta\psi[t+1]=\Delta\psi[t]$.

By using such an operational expression, the azimuth direction attached angle $\Delta\psi$ or, the pitch direction attached angle $\Delta\theta$ and the roll direction attached angle $\Delta\varphi$ are performed on with the time averaging processing, the condition of the flat ground traveling is removed, and the attached angle $[\Delta\psi, \Delta\theta, \Delta\varphi]$ can be estimation calculated. Here, as described above, because the attached angle estimating module 12 is inputted with the acceleration in which the bias frequency component and the noise frequency component are removed, the attached angle $[\Delta\psi, \Delta\theta, \Delta\varphi]$ can accurately be estimation calculated.

Note that, here, "$\alpha$" is a weight value and may suitably be set. However, if the weight value $\alpha$ is set based on a condition as described below, an additional effect can be obtained. Also in here, although only the case for the azimuth direction attached angle $\Delta\psi$ is explained, the similar effect can be obtained also for the pitch direction attached angle $\Delta\theta$ and the roll direction attached angle $\Delta\varphi$.

If, with respect to the weight value $\alpha$, the front-and-rear direction acceleration $a_{x(AG)}{}^s$ in the sensor coordinate system is not "0" and under the straight travel state, and $(-a_{y(AG)}{}^s/a_{x(AG)}{}^s - \Delta\psi[t])$ is below a threshold $\beta$ for detecting a change of the attached angle, $\alpha_1$ is set. Further, if, with respect to the weight value $\alpha$, the front-and-rear direction acceleration $a_{x(AG)}{}^s$ in the sensor coordinate system is not "0" and is in the straight travel state, and $(-a_{y(AG)}{}^s/a_{x(AG)}{}^s - \Delta\psi[t])$ is above the threshold $\beta$ for detecting the change of the attached angle, $\alpha_2$ is set. Here, $\alpha_1$ and $\alpha_2$ are set to satisfy $0 < \alpha_1 \leq \alpha_2 < 1$.

By performing such settings of the weight value $\alpha$, if the attached angle is not changed greatly in the current calculation with respect to the attached angle which is estimation-calculated and time average processed previously, the time averaging processing is performed so that the influence from the attached angle based on the calculation result(s) in the past is efficiently received. On the other hand, if the attached angle is changed greatly in the current calculation with respect to the attached angle which is estimation-calculated and time average processed previously, the time averaging processing is performed so that the influence from the attached angle based on the calculation result(s) in the past is less-efficiently received. Thereby, if the attached angle of the moving state detecting device 1, that is the accelerometer 20, is not changed, the estimation calculation of the attached angle can further accurately be performed by also using the stably attached angle in the past, and even in a case where the attached angle is forcibly be changed by, for example, a user, the estimation calculation of the attached angle can continuously be performed while suppressing the influence due to this change.

The correcting operation module 13 corrects, based on the attached angle [$\Delta\psi$, $\Delta\theta$, $\Delta\varphi$] which is estimation-calculated by the attached angle estimating module 12, the detection acceleration [$a_{x(AG)}^s$, $a_{y(AG)}^s$, $a_{z(AG)}^s$] which is outputted from the frequency analyzing module 11 so as to calculate and output the movable body coordinate system acceleration [$a_x^b$, $a_y^b$, $a_z^b$].

Specifically, this correction is based on the following fundamentals. When having the detection acceleration denoted by [$a_{x(AG)}^s$, $a_{y(AG)}^s$, $a_z(AG)^s$] and the movable body coordinate system acceleration denoted by [$a_x^b$, $a_y^b$, $a_z^b$], the following equation is established.

$$\begin{bmatrix} a_x^b \\ a_y^b \\ a_z^b \end{bmatrix} = C_s^b \begin{bmatrix} a_{x(AG)}^s \\ a_{y(AG)}^s \\ a_{z(AG)}^s \end{bmatrix} \quad (12)$$

"$C_s^b$" is a rotation matrix for converting the accelerometer coordinate system into the movable body coordinate system, and it can be expressed as the following equation using the estimation-calculated attached angle [$\Delta\psi$, $\Delta\theta$, $\Delta\varphi$].

$$C_s^b = \begin{pmatrix} \cos(\Delta\psi) & -\sin(\Delta\psi) & 0 \\ \sin(\Delta\psi) & \cos(\Delta\psi) & 0 \\ 0 & 0 & 1 \end{pmatrix} \quad (13)$$

$$\begin{pmatrix} \cos(\Delta\theta) & 0 & \sin(\Delta\theta) \\ 0 & 1 & 0 \\ -\sin(\Delta\theta) & 0 & \cos(\Delta\theta) \end{pmatrix} \begin{pmatrix} 1 & 0 & 0 \\ 0 & \cos(\Delta\phi) & -\sin(\Delta\phi) \\ 0 & \sin(\Delta\phi) & \cos(\Delta\phi) \end{pmatrix} =$$

$$\begin{pmatrix} \cos(\Delta\psi)\cos(\Delta\theta) & \begin{array}{c}-\sin(\Delta\psi)\cos(\Delta\phi)+ \\ \cos(\Delta\psi)\sin(\Delta\theta)\sin(\Delta\phi)\end{array} & \begin{array}{c}\sin(\Delta\psi)\sin(\Delta\phi)+ \\ \cos(\Delta\psi)\sin(\Delta\theta)\cos(\Delta\phi)\end{array} \\ \sin(\Delta\psi)\cos(\Delta\theta) & \begin{array}{c}\cos(\Delta\psi)\cos(\Delta\phi)+ \\ \sin(\Delta\psi)\sin(\Delta\theta)\sin(\Delta\phi)\end{array} & \begin{array}{c}-\cos(\Delta\psi)\sin(\Delta\phi)+ \\ \sin(\Delta\psi)\sin(\Delta\theta)\cos(\Delta\phi)\end{array} \\ -\sin(\Delta\theta) & \cos(\Delta\theta)\sin(\Delta\phi) & \cos(\Delta\theta)\cos(\Delta\phi) \end{pmatrix}$$

Note that, when each component of the attached angle [$\Delta\psi$, $\Delta\theta$, $\Delta\varphi$] is $\Delta\psi \ll 1$ [rad], $\Delta\theta \ll 1$ [rad], and $\Delta\varphi \ll 1$ [rad], the rotation matrix $C_s^b$ can be approximated as the following equation.

$$C_s^b = \begin{bmatrix} 1 & -\Delta\psi & \Delta\theta \\ \Delta\psi & 1 & -\Delta\phi \\ -\Delta\theta & \Delta\phi & 1 \end{bmatrix} \quad (14)$$

The correcting operation module 13 converts the detection acceleration [$a_{x(AG)}^s$, $a_{y(AG)}^s$, $a_{z(AG)}^s$] into the movable body coordinate system acceleration [$a_x^b$, $a_y^b$, $a_z^b$] by using such a rotation matrix $C_s^b$ and outputs it.

By the time of performing such correction processing, the bias frequency component and the noise component have been removed from the detection acceleration outputted from the frequency analyzing module 11, and the attached angle has been highly accurately estimation-calculated, therefore, the movable body coordinate system acceleration [$a_x^b$, $a_y^b$, $a_z^b$] to be calculated can be a highly accurate value.

The speed/traveling-angle calculating module 30 calculates a traveling speed and a traveling angle of the movable body based on the following fundamentals. Note that, in the following explanation, an example in which only a traveling speed $V_x$ in the front-and-rear directions of the movable body and a traveling pitch angle $\theta$ serving as a traveling angle in the up-and-down directions thereof are calculated is described; however, by using the similar fundamentals, a traveling speed and a traveling angle in other directions can be calculated.

When having the gravity acceleration denoted by g, the following relations are established among the front-and-rear direction component $a_x^b$ and the up-and-down direction component $a_z^b$ of the acceleration in the movable body coordinate system, the traveling speed $V_x$ in the front-and-rear directions, and the traveling pitch angle $\theta$.

$$a_x^b = \frac{dv_x}{dt} + g \cdot \theta \quad (15A)$$

$$a_z^b = -v_x \cdot \frac{d\theta}{dt} - g \quad (15B)$$

Here, because the up-and-down direction component $a_z^b$ of the acceleration in the movable body coordinate system is calculated from the detection acceleration [$a_{x(AG)}^s$, $a_{y(AG)}^s$, $a_{z(AG)}^s$] from which the bias frequency component is removed by the wavelet transform, Equation (15B) can be expressed as the following equation.

$$\frac{d\theta}{dt} = \begin{cases} -\dfrac{a_z^b}{v_x} & \ldots v_x \neq 0 \\ 0 & \ldots v_x = 0 \end{cases} \quad (16)$$

Further, similarly, because the front-and-rear direction component $a_x^b$ of the acceleration in the movable body coordinate system is also calculated from the detection acceleration [$a_{x(AG)}^s$, $a_{y(AG)}^s$, $a_{z(AG)}^s$] in which the bias frequency component is removed by the wavelet transform, Equation (15A) can be expressed as the following equation.

$$\frac{dv_x}{dt} = a_x^b - g \cdot \theta \quad (17)$$

Therefore, through the calculation of simultaneous differential equation established by Equations (16) and (17), the traveling speed $V_x$ in the front-and-rear directions and the traveling pitch angle $\theta$ can be calculated.

For achieving this, the speed/traveling-angle calculating module 30 executes the Kalman filter processing expressed as the following equations. Note that, in the following equations, "t" indicates a time (operation timing), and "$\Delta t$" indicates an update time interval.

$$v_x[t+1] = a_x^b[t] - g \cdot \theta[t] \cdot \Delta t \quad (18A)$$

$$\theta[t+1] = \begin{cases} \theta[t] - \dfrac{a_z^b[t]}{v_x[t]} \cdot \Delta t & \ldots v_x[t] \neq 0 \\ \theta[t] & \ldots v_x[t] = 0 \end{cases} \quad (18B)$$

By performing such calculation processing, the traveling speed and the traveling angle of the movable body can be calculated. Here, by using the acceleration in the movable body coordinate system which is obtained with a high accuracy as described above, the traveling speed and the traveling angle can be calculated highly accurately also.

Figure 3:
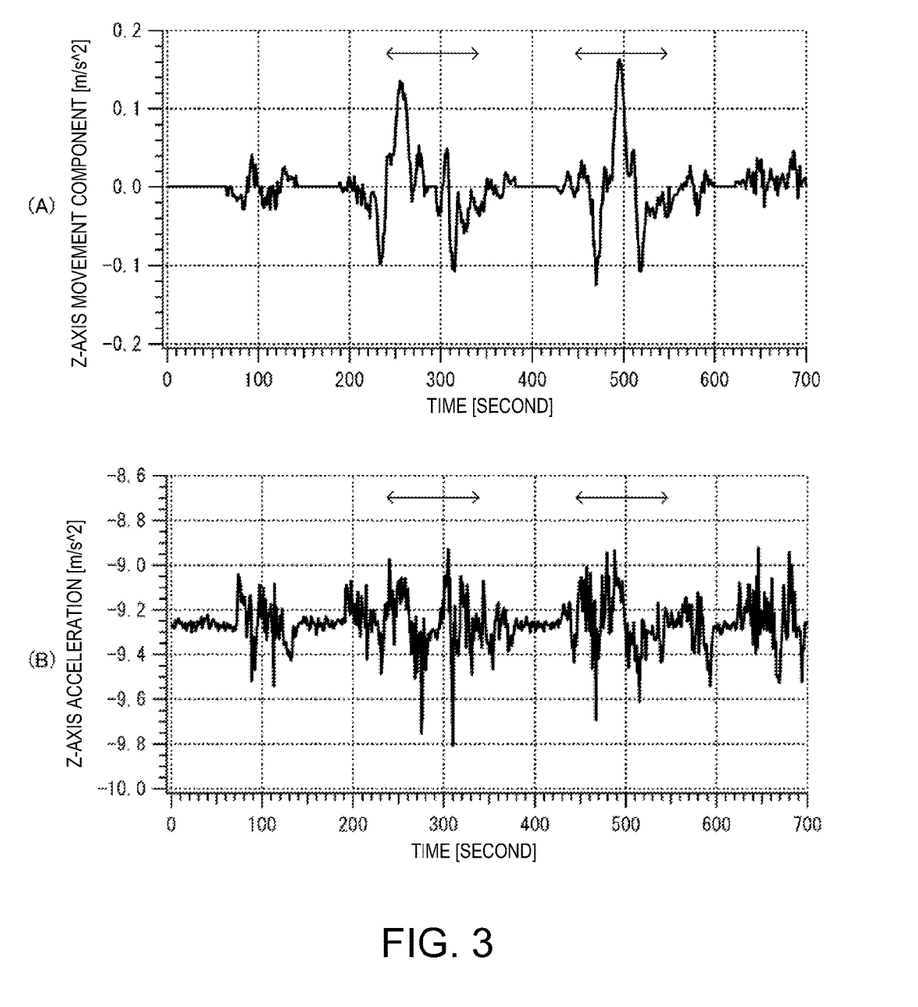
FIG. 3 is charts showing transitions of acceleration in up-and-down directions, with a configuration of this embodiment and the configuration of the conventional art.

By performing such processing, as indicated in the following experimental result, when the movable body travels on either one of the flat ground and the sloped ground with inclination, whether the movable body is traveling on the flat ground or the sloped ground can be correctly distinguished. FIG. 3 is charts showing transitions of the acceleration in the up-and-down directions, in which FIG. 3(A) shows the transition of the acceleration in the up-and-down directions when using the configuration of this embodiment and FIG. 3(B) shows the transition of the acceleration in the up-and-down directions when using the configuration of the conventional art. Note that, in the charts, each zone from approximately 240 to 350 seconds and each zone from approximately 440 to 550 seconds are time ranges of traveling on the sloped ground.

With the configuration of the conventional art, the travel on the sloped ground cannot be detected as shown in FIG. 3(B). However, by using the configuration of this embodiment, as shown in FIG. 3(A), the period of traveling on the sloped ground can be distinguished further distinctly compared to the conventional art.

Note that, in the above explanation, the example in which the traveling speed Vx in the front-and-rear directions and the traveling pitch angle θ are calculated based on Equations (18A) and (18B) is described; however, in this method, a summation error is caused and there is a possibility that the accuracy degrades. Therefore, the speed/traveling-angle calculating module 30 acquires the gravity frequency component $a_{x(G)}^s$ in the front-and-rear direction acceleration $a_x^s$ in the sensor coordinate system acceleration $[a_x^s, a_y^s, a_z^s]$ from the frequency analyzing module 11. Further, the speed/traveling-angle calculating module 30 divides the gravity frequency component by the gravity acceleration g to calculate a correction traveling pitch angle θc.

The speed/traveling-angle calculating module 30 performs weight averaging processing between the traveling pitch angle θ, which can be obtained from Equations (18A) and (18B) described above, and the correction traveling pitch angle θc so as to calculate the traveling pitch angle to be outputted. By performing such processing, the summation error can be prevented from accumulating and the accuracy degradation due to a long-term operation processing can be suppressed. Note that a timing for performing the weight averaging processing may be set to each timing of calculating the traveling pitch angle θ, and, alternatively, may suitably be set to a longer predetermined timing interval.

Next, a moving state detecting device according to a second embodiment is described in detail with reference to the drawings.

Figure 4:
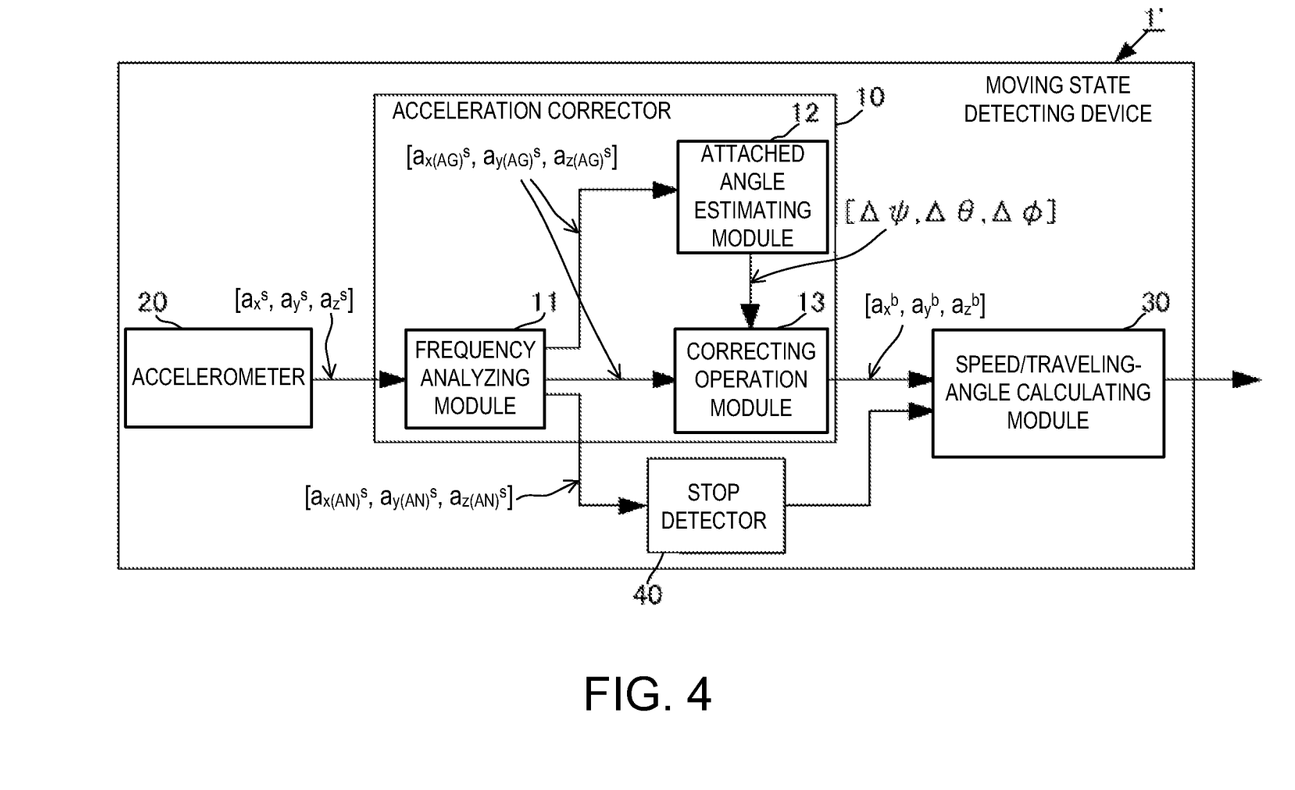
FIG. 4 is a block diagram showing a main configuration of a moving state detecting device 1' of a second embodiment.

FIG. 4 is a block diagram showing a main configuration of the moving state detecting device 1' of this embodiment.

The moving state detecting device 1' of this embodiment is the moving state detecting device 1 described in the first embodiment with a stop detecting module 40 added thereto. Hereinafter, only the stop detecting module 40 and parts relating thereto are explained.

The stop detecting module 40 acquires a stop detection acceleration $[a_{x(AN)}^s, a_{y(AN)}^s, a_{z(AN)}^s]$ comprised of a sum of the movement acceleration frequency component and the noise frequency component of the sensor coordinate system acceleration $[a_x^s, a_y^s, a_z^s]$. The stop detecting module 40 stores, in advance, thresholds (≠0) for detecting a stop, for a front-and-rear direction component $a_{x(AN)}^s$ and a left-and-right direction component $a_{y(AN)}^s$ of the stop detection acceleration $[a_{x(AN)}^s, a_{y(AN)}^s, a_{z(AN)}^s]$ When stop detecting module 40 detects that the front-and-rear direction component $a_{x(AN)}^s$ and the left-and-right direction component $a_{y(AN)}^s$ are both below the threshold for detecting the stop, it determines that the movable body is stopped and outputs stop detection data to the speed/traveling-angle calculating module 30. After the speed/traveling-angle calculating module 30 acquires the stop detection data, it sets the traveling speed $V_x$ in the front-and-rear direction=0 and calculates a traveling pitch angle θ, based on Equation (18B) described above, according to the setting.

With such a configuration and processing, the stopping of the movable body can be distinguished through the simple processing.

Next, a moving state detecting device according to a third embodiment is described in detail with reference to the drawings.

Figure 5:
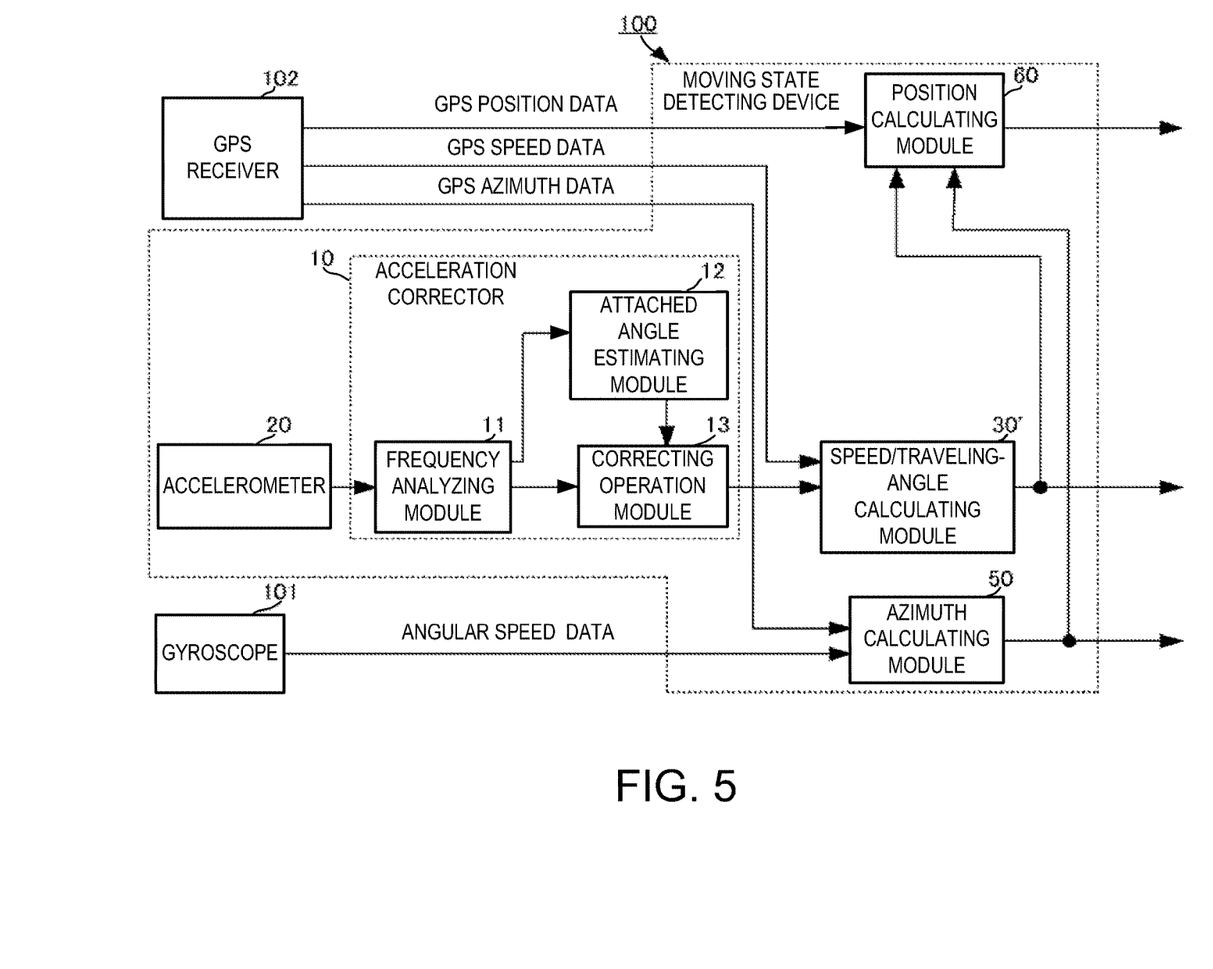
FIG. 5 is a block diagram showing a main configuration of a moving state detecting device 100 of a third embodiment.

FIG. 5 is a block diagram showing a main configuration of the moving state detecting device 100 of this embodiment.

The moving state detecting device 100 of this embodiment calculates a position and a moving azimuth of the movable body based on various kinds of data from a GPS receiver 102 and angle speed data from a gyroscope 101, in addition to the speed and the traveling angle obtained with the configuration of the moving state detecting device 1 described in the first embodiment. Therefore, in the description below, description of parts that are same as the configuration of the moving state detecting device 1 described in the first embodiment are omitted and only different parts are described.

The moving state detecting device 100 includes an azimuth calculating module 50 and a position calculating module 60 as well as the configuration of the moving state detecting device 1, and is connected with the gyroscope 101 and the GPS receiver 102.

The gyroscope 101 is configured to be able to detect a turn in an azimuth direction at least, detects an angular velocity in the azimuth direction, and outputs it to the azimuth calculating module 50.

The GPS receiver 102 receives GPS signals from GPS satellites, performs positioning based on the received GPS signals in the well-known method, and calculates GPS position data, GPS speed data, and GPS azimuth data. The GPS receiver 102 transmits the GPS position data to the position calculating module 60, transmits the GPS speed data to a speed/traveling-angle calculating module 30', and transmits the GPS azimuth data to the azimuth calculating module 50.

In a period of acquiring the GPS speed data, the speed/traveling-angle calculating module 30' uses a differential value of the GPS speed data to calculate a traveling angle based on Equations (18A) and (18B) described above. Alternatively, the speed/traveling-angle calculating module 30' uses, for example, a weight average value of the differential value of the GPS speed data and the movable body coordinate system acceleration $[a_x^b, a_y^b, a_z^b]$, which is transmitted from the acceleration corrector 10, to calculate the traveling angle based on Equations (18A) and (18B) described above. Whereas, if the GPS speed data cannot be acquired, the speed/traveling-angle calculating module 30', using the GPS speed data, sets the latest outputted speed data to an initial value, and calculates a speed and the traveling angle based on Equations (18A) and (18B) described above.

In the period of acquiring the GPS azimuth data, the azimuth calculating module 50 outputs the GPS azimuth data as it is. Alternatively, the azimuth calculating module 50 may calculate to output a weight average value of the GPS azimuth data and a value where the angular velocity data from the gyroscope 101 is integrated and added to the azimuth data precedingly outputted. Whereas, if the GPS azimuth data cannot be acquired, the azimuth calculating module 50, using the GPS azimuth data, sets the latest outputted azimuth data to an initial value, and, by integrating the angular velocity data and adding the angular velocity data to the initial value, calculates azimuth data.

In the period of acquiring the GPS azimuth data, the position calculating module 60 outputs the GPS position as it is. Alternatively, the position calculating module 60 may calculate to output a weight average value of the GPS position data and a value where speed vectors calculated from the speed data and the traveling angle data from the speed/traveling-angle calculating module 30 and the azimuth data from the azimuth calculating module 50 are integrated and added to the position data previously outputted.

Whereas, if the GPS position data cannot be acquired, the position calculating module 60, using the GPS position data, sets the latest outputted position data to an initial value, and, by integrating the speed vectors calculated from the speed data and the traveling angle data from the speed/traveling-angle calculating module 30 and the azimuth data from the azimuth calculating module 50 and adding the speed vector on the initial value, calculates position data.

By having such configuration, the position, speed, traveling angle, azimuth of the movable body can highly accurately be calculated.

The various kinds of movement information of the movable body highly accurately detected as above is utilized in, for example, navigation processing by a navigation apparatus where the moving state detecting device 1 is mounted. This navigation apparatus at least includes a navigation processing module for executing route navigation processing, a display unit, a user interface, which the display unit can also have the same function. For example, according to an operation input from the user interface, the navigation processing module calculates an optimal route from a current position to a destination of the movable body, and displays the route on the display unit. Further, as described above, because the movement information of the movable body can be obtained highly accurately, the navigation apparatus can achieve accurate navigation processing.

Note that, in this embodiment, the example in which the configuration of this embodiment is applied to the configuration of the first embodiment is described; however, the configuration of this embodiment may be similarly applied to the configuration of the second embodiment.

Further, in the above description, the example in which the wavelet transform is performed by the frequency analyzing module 11 is described. Although, desirably, the wavelet transform is preferably utilized, other frequency conversion processing, such as Fourier transform processing may be performed, and further alternatively, by a plurality of filters having pass frequency bands different from each other, the sensor coordinate system acceleration may be divided into the frequency components, respectively.

Further, in the above description, the example in which the acceleration corrector 10 is functionally divided into the frequency analyzing module 11, the attached angle estimating module 12, and the correcting operation module 13 is described; however, the functions of these modules may be achieved by a single arithmetic element and an executable program. Further, the functions of the acceleration corrector 10 and either one of the speed/traveling-angle calculating modules 30 and 30' may be achieved by a single arithmetic element and an executable program, and in addition thereto, the above functions with the inclusion of the stop detecting module 40 may be achieved by a single arithmetic element and an executable program.

Further, in the above description, the example in which the three-dimensional attached angle $[\Delta\psi, \Delta\theta, \Delta\varphi]$ is estimation-calculated is described; however, at least one of the elements (the azimuth direction attached angle $\Delta\psi$, the pitch direction attached angle $\Delta\theta$, the roll direction attached angle $\Delta\varphi$) of the attached angle $[\Delta\psi, \Delta\theta, \Delta\varphi]$ may be estimation-calculated as required.

Further, in the above description, the example in which the traveling speed $V_x$ and the traveling pitch angle $\theta$ are calculated is described; however, also for these, at least either one of them may be calculated as required.

Further, in the above description, the example in which the sensor coordinate system acceleration $[a_x^s, a_y^s, a_z^s]$ is divided into the four components of the bias frequency component, the gravity frequency component, the movement acceleration frequency component, and the noise frequency component and is used for the estimation calculation is described; however, in the sensor coordinate system acceleration $[a_x^s, a_y^s, a_z^s]$, at least the gravity frequency component and the movement acceleration frequency component may be derived to be used for the estimation calculation of the attached angle. In this case, for example, a bandpass filter having frequency bands corresponding to the gravity frequency component and the movement acceleration frequency component as its pass bands may be used. Further, if using this bandpass filter, processing of, for example, varying the pass band corresponding to the moving state of the movable body, such as the traveling speed, may be performed.

DESCRIPTION OF NUMERALS

1, 1' and 100: Moving State Detecting Device; 10: Acceleration Corrector; 11: Frequency Analyzing Module; 12: Attached Angle Estimating Module; 13: Correcting Operation Module; 20: Accelerometer; 30: Speed/traveling-angle Calculating Module; 40: Stop Detecting Module; 50: Azimuth Calculating Module; 60: Position Calculating Module; 101: Gyroscope; and 102: GPS Receiver.

What is claimed is:

1. A moving state detecting device, comprising:
   an accelerometer installed in a vehicle, the accelerometer being configured to detect acceleration components of a measured acceleration of the vehicle as measured by the accelerometer, with
     a front-and-rear direction acceleration component,
     a left-and-right direction acceleration component, and
     an up-and-down direction acceleration component, all of which are perpendicular to each other respectively; and
   processing circuitry configured
     to divide, for a plurality of frequency bands, the measured acceleration that is obtained from the accelerometer, and
     to estimate an attached angle, at which the accelerometer is physically attached to the vehicle, based on a gravity frequency component, and a movement acceleration frequency component that are formed by predetermined frequency band components, respectively, the processing circuitry being further configured
to evaluate movement of the vehicle based on the acceleration components detected by the accelerometer,
to determine that the vehicle is traveling straight in a front-and-rear direction when the left-and-right direction acceleration component is below a predetermined threshold,
to select, based on the evaluated movement of the vehicle, one of performing vehicle straight traveling processing to correct the estimated attached angle of the accelerometer when the vehicle is traveling straight and refraining from performing the vehicle straight traveling processing, and
upon selecting to perform the vehicle straight traveling processing, perform, while the vehicle is traveling straight, at least one of
an azimuth direction estimation of the attached angle in an azimuth direction based on the front-and-rear direction acceleration component and the left-and-right direction acceleration component, and
a pitch direction estimation of the attached angle in a pitch direction based on the front-and-rear direction acceleration component and the up-and-down direction acceleration component, and the processing circuitry being further configured to, upon selecting to perform the vehicle straight traveling processing:
correct the estimated attached angle of the accelerometer based on at least one of the azimuth direction estimation and the pitch direction estimation to generate a corrected estimated attached angle, and
correct the measured acceleration of the vehicle based on the corrected estimated attached angle to provide a corrected acceleration value representing the acceleration of the vehicle;
wherein the moving state detecting device further comprises a vehicle navigation system configured to provide real-time navigation guidance for the vehicle based on the corrected acceleration value.

2. The moving state detecting device of claim 1, wherein the processing circuitry estimates at least one of the attached angle in the azimuth direction and the attached angle in the pitch direction when the left-and-right direction acceleration component is below the predetermined threshold.

3. The moving state detecting device of claim 1, wherein when the left-and-right direction acceleration component is above the predetermined threshold, the processing circuitry estimates a roll direction attached angle of the vehicle.

4. The moving state detecting device of claim 1, wherein the accelerometer is configured to detect the acceleration components in each of a plurality of axes; and
the processing circuitry is configured to estimate the attached angle of the accelerometer when the acceleration components indicate that the vehicle is traveling straight or turning.

5. A moving state detecting device, comprising:
an accelerometer installed in a vehicle,
the accelerometer being configured to detect acceleration components of a measured acceleration of the vehicle as measured by the accelerometer, with a front-and-rear direction acceleration component, a left-and-right direction acceleration component, and an up-and-down direction acceleration component, all of which are perpendicular to each other respectively; and processing circuitry configured to
divide, for a plurality of frequency bands, an acceleration that is obtained from the accelerometer, and
estimate an attached angle, at which the accelerometer is physically attached to the vehicle, based on a gravity frequency component and a movement acceleration frequency component that are formed by predetermined frequency band components, respectively, the processing circuitry being further configured
to evaluate movement of the vehicle based on the acceleration components detected by the accelerometer, to determine that the vehicle is traveling straight in a front-and-rear direction when the left-and-right direction acceleration component is below a predetermined threshold, and to determine that the vehicle is turning when the left-and-right direction acceleration component is above the predetermined threshold,
to select, based on the evaluated movement of the vehicle, one of performing vehicle straight traveling processing to correct the estimated attached angle of the accelerometer when the vehicle is traveling straight and performing vehicle turning processing to correct the estimated attached angle of the accelerometer when the vehicle is turning,
upon selecting to perform the vehicle straight traveling processing, the processing circuitry:
estimating, while the vehicle is traveling straight, an azimuth direction estimation of the attached angle in an azimuth direction based on the front-and-rear direction acceleration component and the left-and-right direction acceleration component,
estimating, while the vehicle is traveling straight, a pitch direction estimation of the attached angle in a pitch direction based on the front-and-rear direction acceleration component and the up-and-down direction acceleration component, and
correcting the estimated attached angle of the accelerometer based on the azimuth direction estimation and the pitch direction estimation to generate a corrected estimated attached angle;
upon selecting to perform the vehicle turning processing, the processing circuitry:
estimating, while the vehicle is turning, a roll direction estimation of the attached angle in a roll direction based on the front-and-rear direction acceleration component, the left-and-right direction acceleration component, the up-and-down direction acceleration component, and the pitch direction estimation of the attached angle, and
correcting the estimated attached angle of the accelerometer based on the roll direction estimation to generate the corrected estimated attached angle; and
to correct the measured acceleration of the vehicle based on the corrected estimated attached angle to provide a corrected acceleration value representing the acceleration of the vehicle;
wherein the moving state detecting device further comprises a vehicle navigation system configured to provide real-time navigation guidance for the vehicle based on the corrected acceleration value.

6. The moving state detecting device of claim 5, wherein when the left-and-right direction acceleration component is below the predetermined threshold, the processing circuitry estimates at least one of the attached angle in the azimuth direction and the attached angle in the pitch direction.

7. The moving state detecting device of claim 5, wherein the accelerometer is configured to detect the acceleration components in each of a plurality of axes; and
the processing circuitry is configured to estimate the attached angle of the accelerometer when the acceleration components indicate that the vehicle is traveling straight or turning.

8. A moving state detecting device, comprising:
an accelerometer installed in a vehicle to detect a measured acceleration of the vehicle as measured by the accelerometer; and
processing circuitry configured to divide, for a plurality of frequency bands, the measured acceleration that is obtained from the accelerometer, estimate an attached angle, at which the accelerometer is physically attached to the vehicle, based on a gravity frequency component and a movement acceleration frequency component that are formed by predetermined frequency band components, respectively, and correct the measured acceleration of the vehicle based on the attached angle to provide a corrected acceleration value representing the acceleration of the vehicle; and
the processing circuitry being further configured to select, based on a physical operating condition of the vehicle, to calculate a speed of the vehicle, a traveling pitch angle of the vehicle serving as an up-and-down direction inclination angle of the vehicle, or both the speed of the vehicle and the traveling pitch angle of the vehicle, based on the corrected acceleration as corrected by the processing circuitry, and when the processing circuitry selects to calculate the traveling pitch angle, the processing circuitry calculates a divided value of the gravity frequency component by a gravity acceleration and corrects the calculated traveling pitch angle at which the vehicle is traveling based on the divided value to generate a corrected traveling pitch angle value representing a pitch angle at which the vehicle is traveling;
wherein the moving state detecting device further comprises a vehicle navigation system configured to provide real-time navigation guidance for the vehicle based on the corrected acceleration value.

9. The moving state detecting device of claim 8, wherein the processing circuitry is configured to correct the calculated traveling pitch angle by performing a weight averaging processing between the traveling pitch angle and the corrected traveling pitch angle.

10. A moving state detecting device, comprising:
an accelerometer installed in a vehicle to detect a measured acceleration of the vehicle as measured by the accelerometer; and
processing circuitry configured to divide, for a plurality of frequency bands, the measured acceleration that is obtained from the accelerometer, estimate an attached angle, at which the accelerometer is physically attached to the vehicle, based on a gravity frequency component and a movement acceleration frequency component that are formed by predetermined frequency band components, respectively, and correct the measured acceleration of the vehicle based on the attached angle to provide a corrected acceleration value representing the acceleration of the vehicle;
the processing circuitry being further configured to sequentially store the estimated attached angle as well as correct the estimated attached angle through time averaging processing, and, to select whether to reduce a weight of a previously estimated attached angle in the time average processing or to refrain from reducing the weight of the previously estimated attached angle in the time average processing, by evaluating if a latest estimated attached angle is different from the previously estimated attached angle by a predetermined angle or above, and the processing circuitry reduces the weight of the previously estimated attached angle in the time averaging processing when the processing determines by the evaluating that the latest estimated attached angle is different from the previously estimated attached angle by the predetermined angle or above;
wherein the moving state detecting device further comprises a vehicle navigation system configured to provide real-time navigation guidance for the vehicle based on the corrected acceleration value.

11. A moving state detecting device, comprising:
an accelerometer installed in a vehicle and configured to detect multi-axial acceleration components of a measured acceleration of the vehicle as measured by the accelerometer; and
processing circuitry configured:
to evaluate movement of the vehicle based on the acceleration components detected by the accelerometer, to determine that the vehicle is traveling straight in a front-and-rear direction when a left-and-right direction acceleration component is below a predetermined threshold,
to select, based on the evaluated movement of the vehicle, one of performing vehicle straight traveling processing to correct an estimated attached angle of the accelerometer when the vehicle is traveling straight and refraining from performing the vehicle straight traveling processing, and
upon selecting to perform the vehicle straight traveling processing, the processing circuitry:
dividing, for a plurality of frequency bands, the measured acceleration of the vehicle that is obtained from the accelerometer,
estimating the attached angle, at which the accelerometer is physically attached to the vehicle, at least in a pitch direction based on a gravity frequency component and a movement acceleration frequency component while the vehicle is traveling straight, and
correcting the measured acceleration of the vehicle based on the attached angle to provide a corrected acceleration value representing the acceleration of the vehicle;
wherein the moving state detecting device further comprises a vehicle navigation system configured to provide real-time navigation guidance for the vehicle based on the corrected acceleration value.

12. A moving state detecting device comprising:
an accelerometer installed in a vehicle and configured to detect multi-axial acceleration components of a measured acceleration of the vehicle as measured by the accelerometer; and
processing circuitry configured:
to evaluate movement of the vehicle based on the acceleration components detected by the accelerometer, to determine that the vehicle is traveling straight in a front-and-rear direction when a left-and-right direction acceleration component is below a predetermined threshold, and to determine that the vehicle is turning when the left-and-right direction acceleration component is above the predetermined threshold, to select, based on the evaluated movement of the vehicle, one of performing vehicle straight traveling processing to correct an estimated attached angle of the accelerometer when the vehicle is traveling straight and performing vehicle turning processing to correct the estimated attached angle of the accelerometer when the vehicle is turning, upon selecting to perform the vehicle straight traveling processing, the processing circuitry:
  estimating the attached angle, at which the accelerometer is physically attached to the vehicle, in a yaw direction based on front-and-end direction acceleration components and left-and-right direction acceleration components while the vehicle is traveling straight, and
  estimating the attached angle of the accelerometer in a pitch direction based on the front-and-end direction acceleration components and up-and-down direction acceleration components while the vehicle is traveling straight, upon selecting to perform the vehicle turning processing, the processing circuitry estimating the attached angle of the accelerometer in a roll direction based on the front-and-end direction acceleration components, the left-and-right direction acceleration components, the up-and-down direction acceleration components, and the attached angle of the accelerometer in a pitch direction, and to correct the measured acceleration of the vehicle based on the estimated attached angle in the yaw direction, the pitch direction and the roll direction to provide a corrected acceleration value representing the acceleration of the vehicle;

wherein the moving state detecting device further comprises a vehicle navigation system configured to provide real-time navigation guidance for the vehicle based on the corrected acceleration value.

* * * * *